Oct. 24, 1933.　　　H. KEMMER　　　1,932,076
PLANT FOR UTILIZING WASTE HEAT
Filed Dec. 6, 1928　　　2 Sheets-Sheet 1
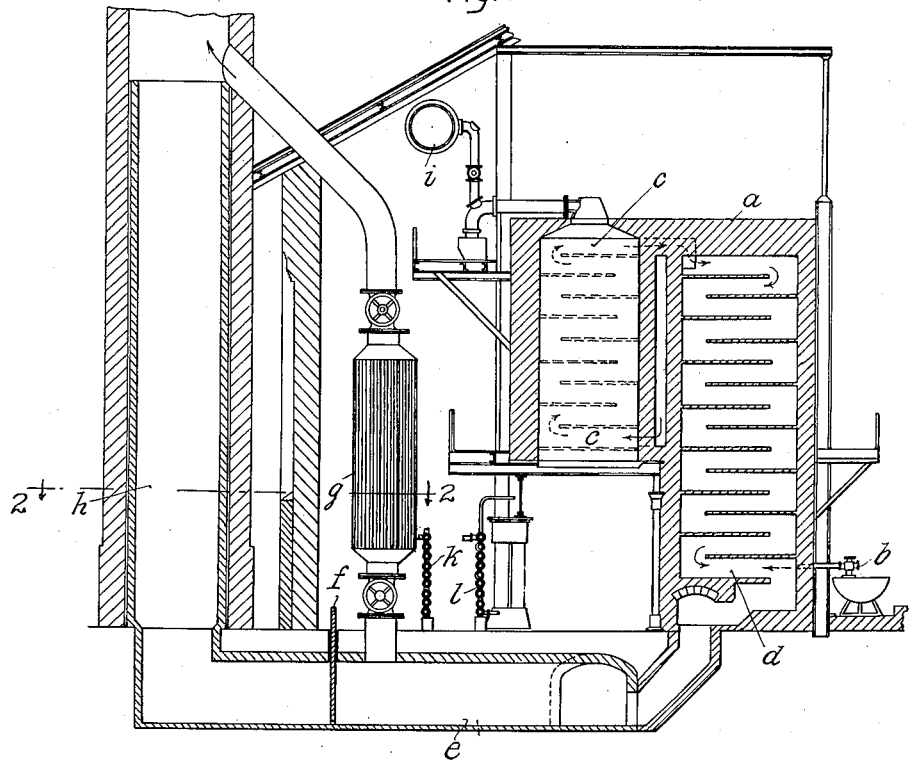
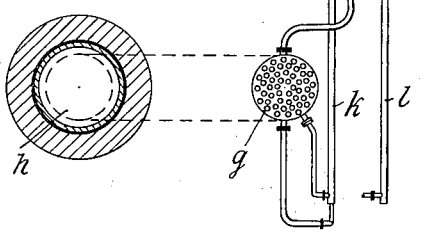
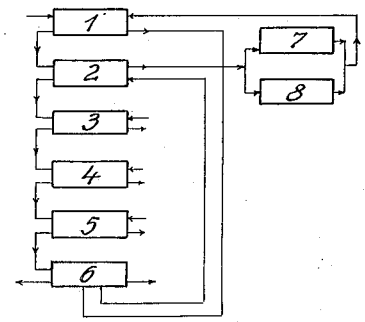
Inventor:
Harald Kemmer
by C. F. Goepel
his Attorney.

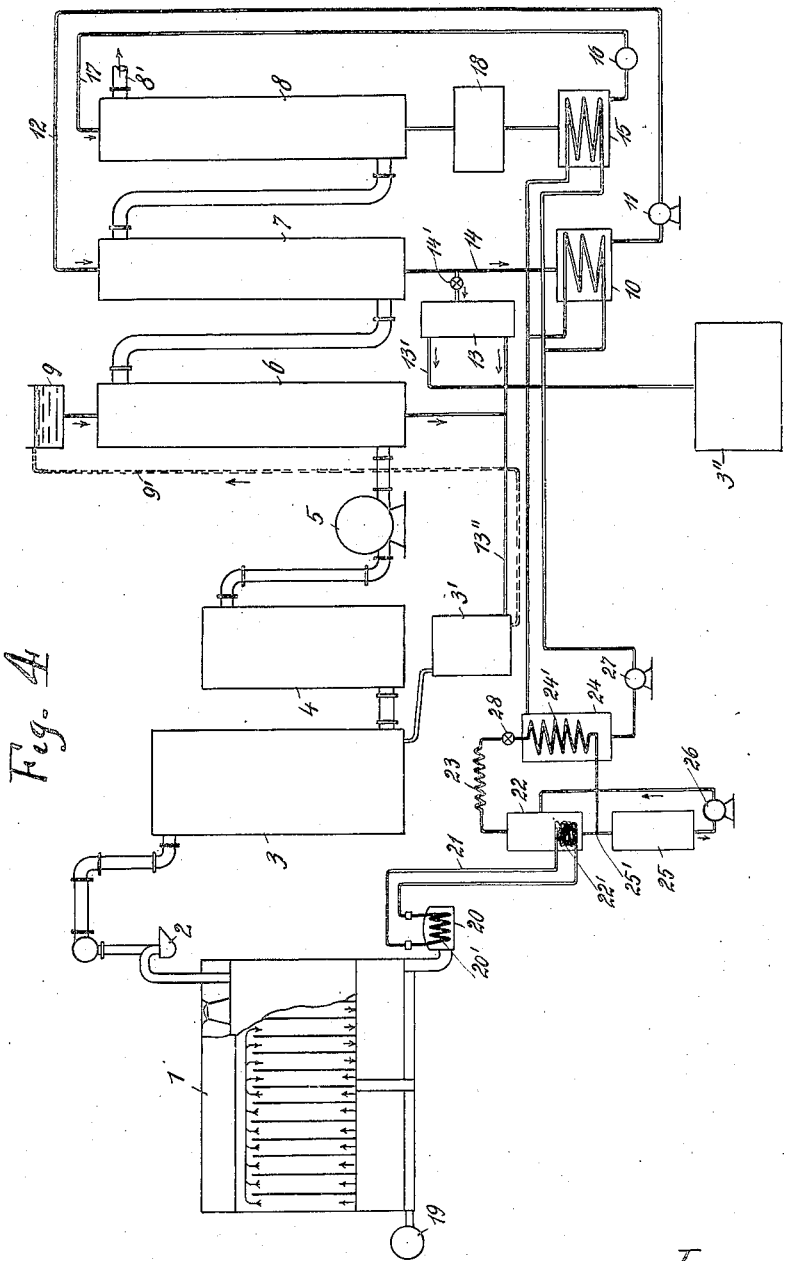

Patented Oct. 24, 1933

1,932,076

UNITED STATES PATENT OFFICE 1,932,076

PLANT FOR UTILIZING WASTE HEAT

Harald Kemmer, Berlin, Germany

Application December 6, 1928, Serial No. 324,336, and in Germany December 6, 1927

1 Claim. (Cl. 62—179)

This invention relates to plants for utilizing waste heat which is of such character and quantity that on the one hand it is too valuable to be lost and on the other hand too small to be economically utilized for the production of steam. More particularly, my invention relates to a plant for utilizing waste heat from products which are treated by a de-gassing or evaporating process, from gas-works, coke-oven plants and so forth. In such cases large quantities of waste heat are produced, for instance, in the form of smoke-gas which is of a temperature of from 400° to 600° C. and in the form of cooling gas (inert gas) for the coke-cinders, said latter gas being ordinarily of a temperature from 600° to 700° C. These two kinds of waste heat alone amount to several percents of the energy supplied to the furnace plant in the form of coal.

Absorption refrigerating machines, as known, may be operated by means of heat. Various further propositions have been made to free raw gas from by-products, such as tar, naphthalene, benzol, ammonia and so forth by a process of cooling and eventually by a process of refrigeration.

A novel feature of my invention now consists in utilizing the waste heat from gas-works, coke-oven plants or similar plants immediately for the production of cold, for instance, in absorption refrigerating machinery, and to use the so produced cold for cooling and purifying gases. While the heretofore known methods of utilizing waste heat are dependent upon the presence of a heat gradient commencing at least at 600° C. in order to obtain a cheap product in the form of steam, the immediate production of cold according to my invention will furnish a valuable product in the form of commercially exploitable cold with a small heat gradient commencing at a low temperature.

A plant according to my invention may be properly operated, even if the heat gradient is largely varying, such as in case of a dry coking process. The product gained according to my invention may be used for purifying the produced gas, for making ice or for the production of cold in refrigerating distributing plants operated by means of liquid ammonia or the like.

In accordance with the varying quantity of available waste heat, which quantity is dependent upon the heat gradient or also upon the season and temperature of the outer air, the produced cold may either be used wholly for the purpose of cooling and purifying the produced mixture or partly for other industrial purposes. An advantage of a plant constructed according to my invention consists therein that there is ordinarily very little gas to be purified during summer-time, while the amount of industrially exploitable cold is rather large. During winter-time apparently the opposite condition will prevail. Preferably, therefore, the plant constructed according to my invention may be dimensioned in accordance with the least quantity of gas produced during summer-time.

The refrigerating plant according to my invention is connected with a further important advantage, that the production of waste heat naturally increases with the amount of produced gas, while the cold produced from said waste heat may well be utilized for purifying this increased quantity of gas.

A still further advantage of the refrigerating plant constructed according to my invention consists therein that the principle of operating gas works with batteries of gas-producers or the like may also be employed in the absorption apparatus. In this form the absorption apparatus may be very cheaply constructed and advantageously co-operate in form of batteries with the several batteries of gas-producers in the gas-works.

A further advantage of my new plant consists therein that the gas-producers may at any time be operated in a most favorable way from the point of view of economy of heat, for instance, either with or without a suction device. The available quantity of waste heat, even if of small amount and of relatively low temperature, may therefore economically be utilized by introducing the same again into the plant.

The invention will best be understood by referring to the accompanying drawings, forming a material part of this specification, and in which:

Figure 1 represents a vertical sectional view through a plant constructed in accordance with my invention;

Fig. 2 is a fragmentary cross section, taken on the line 2—2 of Fig. 1; and

Figs. 3 and 4 are diagrammatical representations in brief and in extenso respectively, showing a low temperature cooling plant embodying the present invention.

As previously intimated, my improvements have for their purpose and object the utilization of waste gases which result from the production of generator gases for refrigeration, and the operation of the refrigerating system is so combined with the use of the waste gases that the heat of the gases under process, that is to say, to be purified, is used for their purification. In the illustrative embodiment, the generator includes the rectifying or purifying chambers *a* and *c*, the gases being introduced into the bottom of the chamber *c* from any suitable source of supply, as from the apparatus *i* for treating smoke-gases. After ascending through the tortuous path of the purifying chamber *c*, the gases under purification are conducted into the top of the chamber *a* to descend by the tortuous path therein toward the main heating channel *e* and against the influence of the absorbing jet at *b*.

Located in a by-path between the main heating channel *e* and flue *b* is a waste heat boiler *g*, the supply of waste heat to this chamber being controlled by the valve or damper *f*. Said waste heat boiler constitutes, of course, a heat collecting or absorbing medium for circulation to the coils *k* and *l*, of which the coils *k* constitute an alternating device for reducing the temperature, while the coils *l* constitute a condensing device.

In the diagrammatical representations of Figs. 3 and 4, I show respectively in brief and in full detail the plan of a low temperature plant for carrying into effect the principles of my invention. The produced gas, such as coke oven gas or city gas, generated in a coke oven as indicated at 1, leaves the oven and is conveyed into a detarring plant 2 in which the heavy tar is separated from the gas. From the detarring plant the gas is passed into a cooling plant 3 which is operated by means of cooling water, a part of the water contained in the gas being removed therefrom in the form of ammonia water. The gas is thereupon passed into an electrically operated tar separator from which it is withdrawn by means of a suction device 5. The gas is now forced into the cooler 6 which may be constructed as a combined pipe and spray cooler and operated with cold water from the plant or with ammonia water taken out of the ammonia container 3'. In the cooler 6 there is separated a further part of the ammonia which leaves the plant together with the water likewise separated from the gas in the form of ammonia water. From the cooler 6 the produced gas is conveyed to a cooler or tower 7 wherein there are separated out products such as benzole, naphthaline, the remainder of the water and ammonia. Thereupon the gas is passed into a cooler or tower 8 which functions to separate the sulphur from the gas.

From the cooler 8 the dry gas, liberated from all constituents which may eventually precipitate, is supplied through the pipe conduit 8' to distributing means from which it is delivered to the several consumption devices, such as burners, furnaces, and the like.

As the purification of the produced gas is carried out in the coolers 7 and 8 by means of a process of low temperature cooling, the production as well as the distribution of the cold medium will be explained before describing in detail the mode of operation of said coolers.

The gas which serves for heating the coke oven 1 may be supplied through the pipe 19. Within the oven the gas undergoes combustion in the usual way, producing heat therein, with the products of combustion including the waste heat leaving through the channel 20. Within the channel 20 there is provided a coil 20', which is connected with a further coil 22' in an ammonia still 22 by means of the pipe conduit 21. A liquid, for instance pressure water, circulates within the pipe connections 20', 21, and 22', said liquid serving as an intermediary carrier of heat taken up from the waste gases in the channel 20 and delivering said heat to the ammonia still 22, thus separating gaseous ammonia mixed with steam. The rectified ammonia, that is the ammonia which is dehydrated in the upper part of the still 22, is thereupon condensed in a condenser 23 at a pressure corresponding to the pressure of the ammonia vapor in the still 22 and caused to expand in a regulating valve 28 or similar device. This expansion causes evaporation of the liquid ammonia in a coil 24' which withdraws the heat necessary for the evaporation of the ammonia from the refrigerating liquid, for instance a salt solution contained in the cooler 24, thus cooling said liquid. The ammonia now leaves the coil 24' in a gaseous state and enters a connecting pipe 25' through which warm weak liquor, after being cooled, flows from the still 22 into an absorber 25. In this conduit the gaseous ammonia is absorbed by the weak liquor which will thus be turned into a strong liquor. This strong liquor is returned by a pump 26 into the still 22, whereupon the afore-described process is completed.

In order to utilize the quantity of heat contained in the warm weak liquor, a heat exchanger (not shown) is inserted intermediate the still 22 and the absorber 25. In this heat exchanger the amount of heat contained in the warm weak liquor is transmitted to the cold strong liquor before the latter is carried to the still 22.

The refrigerating liquid is taken off the cooler 24 by means of a pump 27, circulated through cooling coils within the containers 10 and 15 and then returned to the cooler 24.

Ice cells may be placed into the refrigerating liquid in the cooler 24, said ice cells consisting of oblong blocks of the form of the ice blocks which are obtainable in commerce. These coils or blocks, preferably made from zinc are filled with water which subsequently is caused to freeze. In this manner the cooler may simultaneously act as an ice producing plant.

However, it will also be possible to place the ice producer at some distance from the cooler 24 and to connect said ice producer with the circuit of the refrigerating liquid.

In like manner liquid ammonia may be taken off the condenser 23 and conveyed through a pipe, to some remote place where it may be used for the production of cold.

Instead of conveying liquid ammonia by means of conduits to some distant point, it is also possible to convey refrigerating liquid to some distant place of use. The container 10 serves for cooling the wash oil which is thereupon carried to the spray cooler 7 through the conduit 12 by the operation of a pump 11. Benzole ($C_6H_6$), naphthaline, ammonia and water will be separated in this part of the plant and flow back together with the wash oil through the conduit 14 into the container 10, and continue to circulate in the afore-described manner. Where the wash oil is enriched with benzole and naphthaline to an extent practically exhausting its ability of reception, the oil in such event may be carried into a separating container 13 by opening a valve 14'. In container 13 the aqueous condensates (ammonia water) will be separated from the oily condensates in accordance with their specific gravity. The highly concentrated ammonia water sinks towards the bottom and is thereupon conveyed to an ammonia water container 3' through a pipe 13''. The mixture of oil, benzole and napthaline of smaller specific gravity floating on top is conveyed to a benzole still 3'' through a pipe 13'. To the ammonia water container 3' there is also supplied the high percent ammonia water coming from the cooler 3' and which communicates with a container 9 by means of a conduit 9' so that ammonia water for operating the cooler 6 may be taken off said container 3'. The importance of separating benzole, naphthaline, the remainder of ammonia, as well as the remainder of water in the cooler 7 is found to reside primarily in the fact that by a process of low temperature cooling there will be produced a gas which is free of these constituents and that by reason of the considerably increased benzole absorbing ability of the wash oil in cold condition, there will only be necessary an amount of wash oil which is a part of the amount of wash oil used in plants of known construction.

Separation of the sulphur takes place in the spray tower 8 by means of under-cooled ammonia water, a solution of soda or the like which according to the special conditions may further contain floated up iron compounds. The wash liquid is taken out of the container 15 by a pump 16 and forced into the cooling tower 8 through a pipe 17. From the cooling tower 8 the wash liquid passes into a container 18 to be regenerated therein. From here again the circulation takes place in the manner above described.

It is possible to carry out my present invention without the use of a refrigerating liquid. In this case the tank 10 for the wash oil and the container 15 for the wash liquid which serves for the separation of the sulphur, together with the coils in said containers may be dispensed with. The cooler 24 in the present case is constructed to contain two chambers of which one serves for cooling the wash oil and the other for cooling the wash liquid which is used for the separation of the sulphur. Thereupon from the cooler 24 the wash oil and the wash liquid for the separation of the sulphur are conveyed to the towers 7 and 8 by means of pumps and after leaving said towers are carried again to the cooler to continue the above-described circulation.

My invention is not limited to gas-works as illustrated by the aforegiven example and may be also used with advantage by properly modifying the apparatus for all similar cases, such as for instance for cooling the furnace gases in order to remove the dust therefrom, or the like. Such modifications of the plant will be apparent to anyone skilled in the art.

It will further be possible to use the cooling water produced in the refrigerating plant according to my invention for cooling air and to introduce this cooled air into the plant. This may, for instance, be done in connection with large closed gas producers and the like.

A plant constructed according to my invention will result in considerable savings, not only as regards apparatus and space but also as regards cooling water and cost of operation and supervision. The savings due to the adoption of a plant constructed according to my invention are so apparent that no further explanations will be necessary.

I claim:

The process of utilizing waste heat of coke oven plants, gas works and the like, said process consisting in using said waste heat for producing cold by means of absorption type refrigerating machines, and in using the cold so produced for the purification of the produced gas (coke oven gas, city gas) by cooling at low temperatures.

HARALD KEMMER.